US012651824B2

(12) United States Patent
Kafry et al.

(10) Patent No.: US 12,651,824 B2
(45) Date of Patent: Jun. 9, 2026

(54) SEALING UTILITY METER TRANSCEIVER ENCLOSURES

(71) Applicant: ST Engineering Telematics Wireless Ltd., Holon (IL)

(72) Inventors: Eddy Kafry, Hod Hasharon (IL); Shlomo Izicovitch, Ramle (IL); David Otmazgin, Modi'in (IL); Ofir Ben David, Rehovot (IL)

(73) Assignee: ST Engineering Telematics Wireless Ltd., Holon (IL)

( * ) Notice: Subject to any disclaimer, the term of this patent is extended or adjusted under 35 U.S.C. 154(b) by 283 days.

(21) Appl. No.: 18/249,391

(22) PCT Filed: Nov. 11, 2021

(86) PCT No.: PCT/IL2021/051342
§ 371 (c)(1),
(2) Date: Apr. 18, 2023

(87) PCT Pub. No.: WO2022/101908
PCT Pub. Date: May 19, 2022

(65) Prior Publication Data
US 2023/0387569 A1 Nov. 30, 2023

Related U.S. Application Data

(60) Provisional application No. 61/112,679, filed on Nov. 12, 2020.

(51) Int. Cl.
*H01Q 1/22* (2006.01)
*G01D 4/00* (2006.01)
*G01D 11/24* (2006.01)
*H01Q 9/06* (2006.01)

(52) U.S. Cl.
CPC .......... *H01Q 1/2233* (2013.01); *G01D 4/002* (2013.01); *G01D 11/245* (2013.01); *H01Q 9/065* (2013.01)

(58) Field of Classification Search
None
See application file for complete search history.

(56) References Cited

U.S. PATENT DOCUMENTS

| | | | |
|---|---|---|---|
| 5,428,364 A | 6/1995 | Lee | |
| 5,825,303 A | 10/1998 | Bloss, Jr. | |
| 6,072,405 A * | 6/2000 | Sears ................... | G01F 15/063 361/667 |
| 10,164,320 B1 | 12/2018 | Stuyvenberg | |
| 2008/0074283 A1* | 3/2008 | Verkleeren ........... | H01Q 1/2233 340/870.02 |

(Continued)

OTHER PUBLICATIONS

International Search Report for corresponding application PCT/IL2021/051342 mailed on Mar. 24, 2022.

*Primary Examiner* — Jany Richardson
(74) *Attorney, Agent, or Firm* — Heidi Brun Associates Ltd.; Heidi M. Brun

(57) ABSTRACT

A sealed utility transceiver assembly includes a transceiver board, a sealed housing, and a measure of liquid potting compound. The transceiver board includes multiple components and an antenna. The sealed housing includes a cavity within which to house the transceiver board. The measure of liquid potting compound encapsulates a portion of the transceiver board within the sealed housing, which portion does not include the entirety of the antenna.

18 Claims, 15 Drawing Sheets

(56)     References Cited

U.S. PATENT DOCUMENTS

2010/0026515  A1 *   2/2010   Lazar ..................... G01D 4/002
                                                          340/870.02
2010/0182204  A1 *   7/2010   Hao ..................... H01Q 1/2233
                                                          343/702
2019/0260107  A1      8/2019   Baur

* cited by examiner

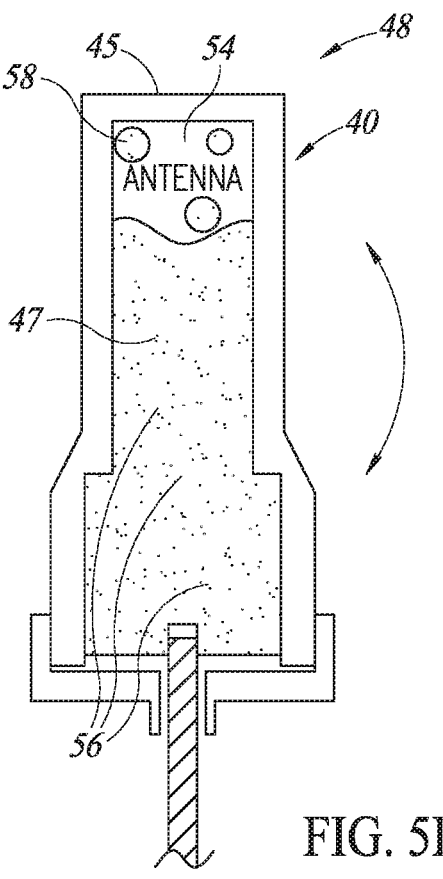
FIG. 5D
| FO: 915 MHz | | |
| --- | --- | --- |
| GAIN | H-PLANE | E-PLANE |
| AVG | 1.09 | -1.87 |
| MAX | 1.59 | 4.42 |
| MIN | 0.76 | -22.08 |
FIG. 6A
H-PLANE AT 915 MHz
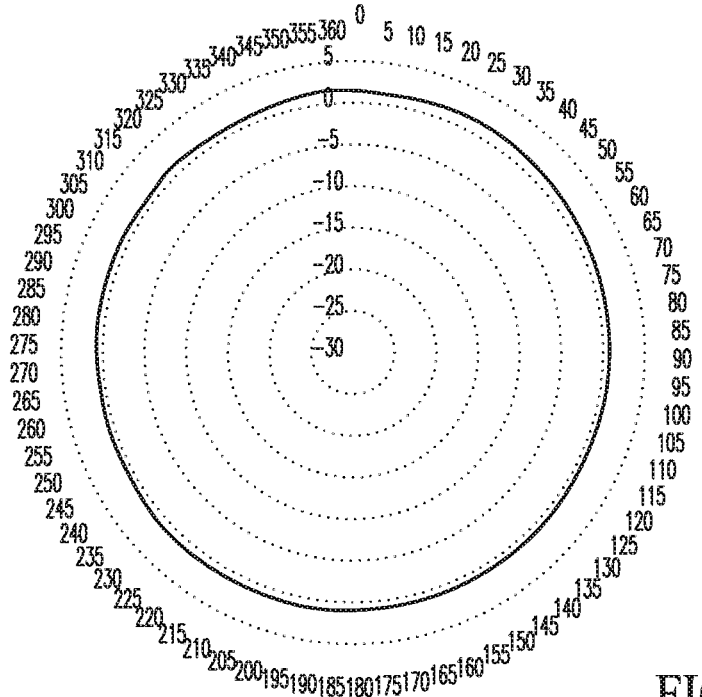
FIG. 6B

| FO: 915 MHz | | |
|---|---|---|
| GAIN | H-PLANE | E-PLANE |
| AVG | −0.51 | −1.05 |
| MAX | 1.59 | 5.09 |
| MIN | −3.14 | −23.74 |

H-PLANE AT 915 MHz

E-PLANE AT 915 MHz

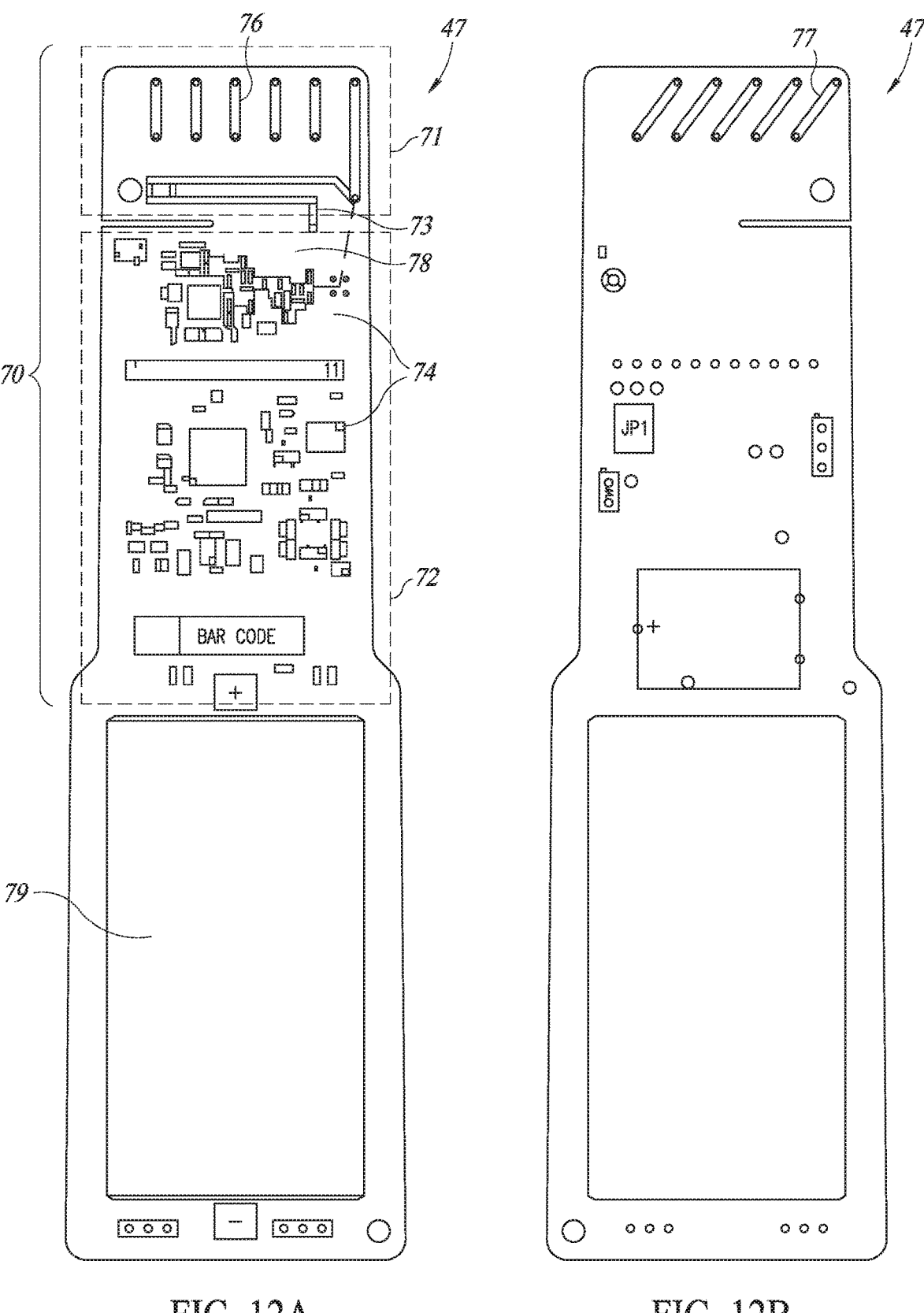
FIG. 12A                    FIG. 12B

SEALING UTILITY METER TRANSCEIVER ENCLOSURES

CROSS REFERENCE TO RELATED APPLICATIONS

This application is a national phase application of PCT/IL2021/051342, filed Nov. 11, 2021, which claims priority from U.S. provisional patent application 63/112,679, filed Nov. 12, 2020, both of which are incorporated herein by reference.

FIELD OF THE INVENTION

The present invention relates to utility meter transceivers generally and to sealing and/or potting them within external enclosures in particular.

BACKGROUND OF THE INVENTION

In temperate climates, water service lines may be buried in the ground. Access to utility meters attached to such service lines may be via a meter-pit, such as meter pit 1 of FIG. 1, to which reference is now made. Meter-pit 1 houses one or more utility meters 5 connected to water service-lines 4. Water-pit 1 may be covered by a pit-cover 2 which may have a transceiver assembly 6 suspended through a hole in pit-cover 2 and secured from above via a cap 8 on the top of pit-cover 2 and from below by a collar 9 on the underside of pit-cover 2. It should be noted that installing transceiver assembly 6 through pit-cover 2 is one of many different installation methods known in the art, other methods may or may not have the transceiver connected to pit-cover 2. Transceiver assembly 6 may be connected to one or many meters 5 via an interface cable 11.

Transceiver assembly 6 may periodically, or upon command from a data collection device (not shown), read utility meter 5. Data collected may include indexes, statuses, alarms, and other readings. Data collected is transmitted wirelessly to a data collection device.

As described in U.S. Pat. No. 5,825,303, transceivers used in water-pits and external applications need to be sealed into enclosures to protect them against water, humidity, and dust. As shown in FIG. 2, to which reference is now made, this is achieved by inserting a transceiver board 12 into an enclosure 13 comprising a cavity with a closed end 19 and an open end 20. One example of such an enclosure is a cylindrical tube, closed at one end. Enclosure 13 is filled with liquid potting compound 14 which solidifies within a short time. As a result, potting compound 14 seals transceiver board 12 within enclosure 13.

Transceiver board 12 comprises a printed circuit board with a number of sections. For example; an RF-transceiver to communicate with a data collection device (not shown), a central processing unit (CPU) to process meter data and handle data transmission, a battery to power the transceiver (not shown) and an onboard antenna 18. Transceiver board 12 may be connected to one or more utility meters 5 via interface cables 11. It should be noted that when in use, the preferred orientation for transceiver assembly 6 may be so that antenna 18 is topmost, but this is not always the case. In FIG. 2, the assembly is shown with antenna 18 downmost, as this is the orientation for filling it with liquid potting compound 14.

U.S. Pat. No. 10,164,320 teaches that encasing antenna 18 of such a transceiver assembly 6 in potting compound 14 has a negative impact on the operation of antenna 18 and hence the performance of transceiver assembly 6.

As shown in FIG. 3, to which reference is briefly made, U.S. Pat. No. 10,164,320 teaches to keep the antenna free of potting compound by placing a gasket 21 within enclosure 13 to create two cavities: section 24 houses antenna 18, and another section 23 houses other parts of transceiver board 12. When liquid potting compound 14 is added to enclosure 13, via open end 20, it flows only into section 23, thus keeping antenna 18 free of potting compound.

SUMMARY OF THE PRESENT INVENTION

There is therefore provided, in accordance with a preferred embodiment of the present invention, a sealed utility transceiver assembly. The assembly includes a transceiver board, a sealed housing, and a measure of liquid potting compound. The transceiver board includes multiple components and an antenna; the sealed housing includes a cavity within which to house the transceiver board. The measure of liquid potting compound encapsulates a portion of the transceiver board within the sealed housing, which portion does not include the entirety of the antenna.

Moreover, in accordance with a preferred embodiment of the present invention, the sealed housing includes a first part and a second part, such that the first part and the second part combine to form the sealed housing. and the first part and the second part is either a cylindrical shaped enclosure with an interlocking cylindrical shaped cap or two parts of a non-uniform shaped enclosure.

Further, in accordance with a preferred embodiment of the present invention, the non-uniform shaped enclosure includes an attachment means to attach the assembly to a utility meter.

Still further, in accordance with a preferred embodiment of the present invention, the utility is water, gas, electricity, energy, or fuel.

Additionally, in accordance with a preferred embodiment of the present invention, the sealed housing includes an interface-opening in the sealed housing to enable an interface cable from the transceiver board to exit the sealed housing.

Moreover, in accordance with a preferred embodiment of the present invention, the interface-opening includes a gasket inside the interface-opening to seal the interface cable within the interface-opening and to stop the measure of liquid potting compound from leaking from the interface-opening.

Alternatively, in accordance with a preferred embodiment of the present invention, the sealed housing further includes a means of ingress, and a means to seal the means of ingress. The means of ingress enables the measure of liquid potting compound to be added to the sealed housing, and the means to seal the means of ingress after addition of the measure of liquid potting compound.

Further, in accordance with a preferred embodiment of the present invention, the antenna is either a dipole antenna, or a monopole antenna.

Still further, in accordance with a preferred embodiment of the present invention, the dipole antenna includes a printed PCB antenna, multiple antenna-elements, a non-LRC impedance matching antenna element, and a second antenna pole. The printed PCB antenna is printed on two sides of the transceiver board, the multiple antenna-elements are attached to the printed PCB antenna, such that the printed PCB antenna implements a first antenna pole of the dipole antenna. The non-LRC impedance matching antenna element increases the gain of the dipole antenna and adjusts the total impedance of the dipole antenna to match the output impedance of the transceiver board, and the second antenna pole is implemented with a portion of the electrical components of the transceiver board.

Additionally, in accordance with a preferred embodiment of the present invention, a portion of the non-LRC impedance matching antenna element and the second antenna pole are completely covered by the measure of liquid potting compound.

There is also provided, in accordance with a preferred embodiment of the present invention, a method for assembling a sealed utility transceiver assembly. The method includes partially filling the assembly with a measure of liquid potting compound, the assembly including a transceiver board, multiple components, an antenna, and a sealed housing including a cavity within which to house the transceiver board. The method also includes repositioning the assembly to enable the measure of liquid potting compound to settle away from the antenna.

Further, in accordance with a preferred embodiment of the present invention, partially filling includes pouring the measure of liquid potting compound through the means of ingress.

Still further, in accordance with a preferred embodiment of the present invention, the method also includes, before partially filling, inserting the transceiver board into the sealed housing, the sealed housing including a first part and a second part, connecting the first part and the second part to form the sealed housing, the sealed housing having a means of ingress for the measure of liquid potting compound and a means to seal the means of ingress, and sealing the means of ingress after partially filling.

Additionally, in accordance with a preferred embodiment of the present invention, the first part and the second part is either a cylindrical shaped enclosure with an interlocking cylindrical shaped cap, or two parts of a non-uniform shaped enclosure.

Alternatively, in accordance with a preferred embodiment of the present invention, the non-uniform shaped enclosure includes an attachment means to attach the assembly to a utility meter.

Further, in accordance with a preferred embodiment of the present invention, the utility is water, gas, electricity, energy, or fuel.

Still further, in accordance with a preferred embodiment of the present invention, the method also includes, after partially filling, inserting the transceiver board into the sealed housing, the sealed housing including a first part and a second part, connecting the first part and the second part to form the sealed housing, the sealed housing having a means of ingress for the measure of liquid potting compound and a means to seal the means of ingress, and sealing the means of ingress after partially filling.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 5A, 5B, 5C and 5D are schematic illustrations of a method of sealing an exemplary transceiver assembly;

FIGS. 6A and 6D are tabular representations of antenna test results;

FIGS. 6B, 6C, 6E and 6F are graphical representations antenna test results;

FIGS. 12A and 12B are schematic illustrations of an exemplary transceiver board.

Figure 1:
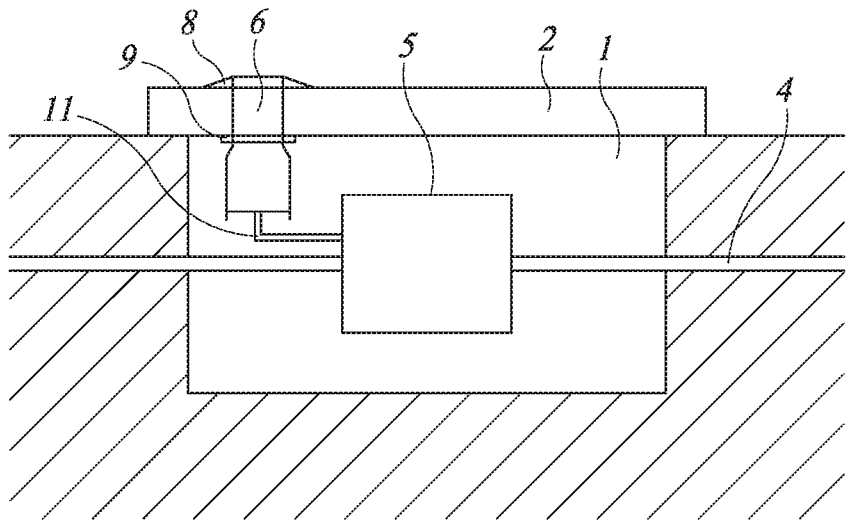
FIG. 1 is a schematic illustration of a prior art utility meter pit.
Figure 2:
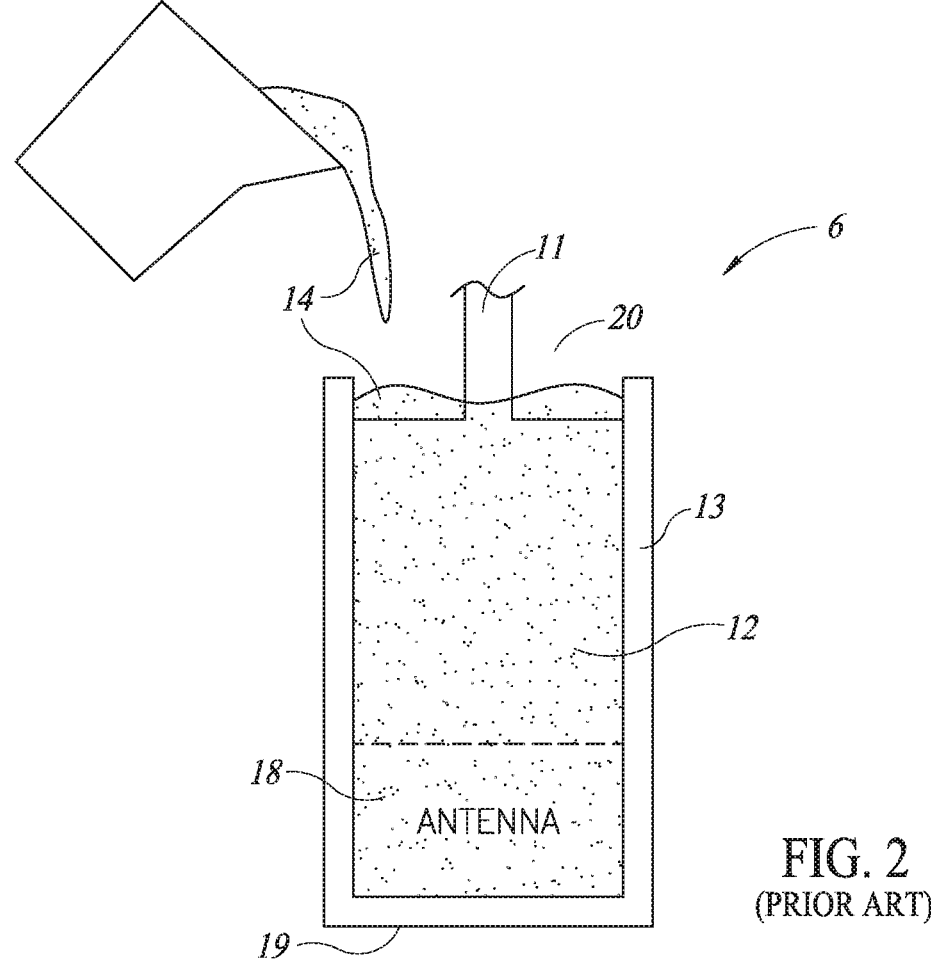
FIG. 2 is a schematic illustration of a prior art method of sealing a transceiver enclosure.
Figure 3:
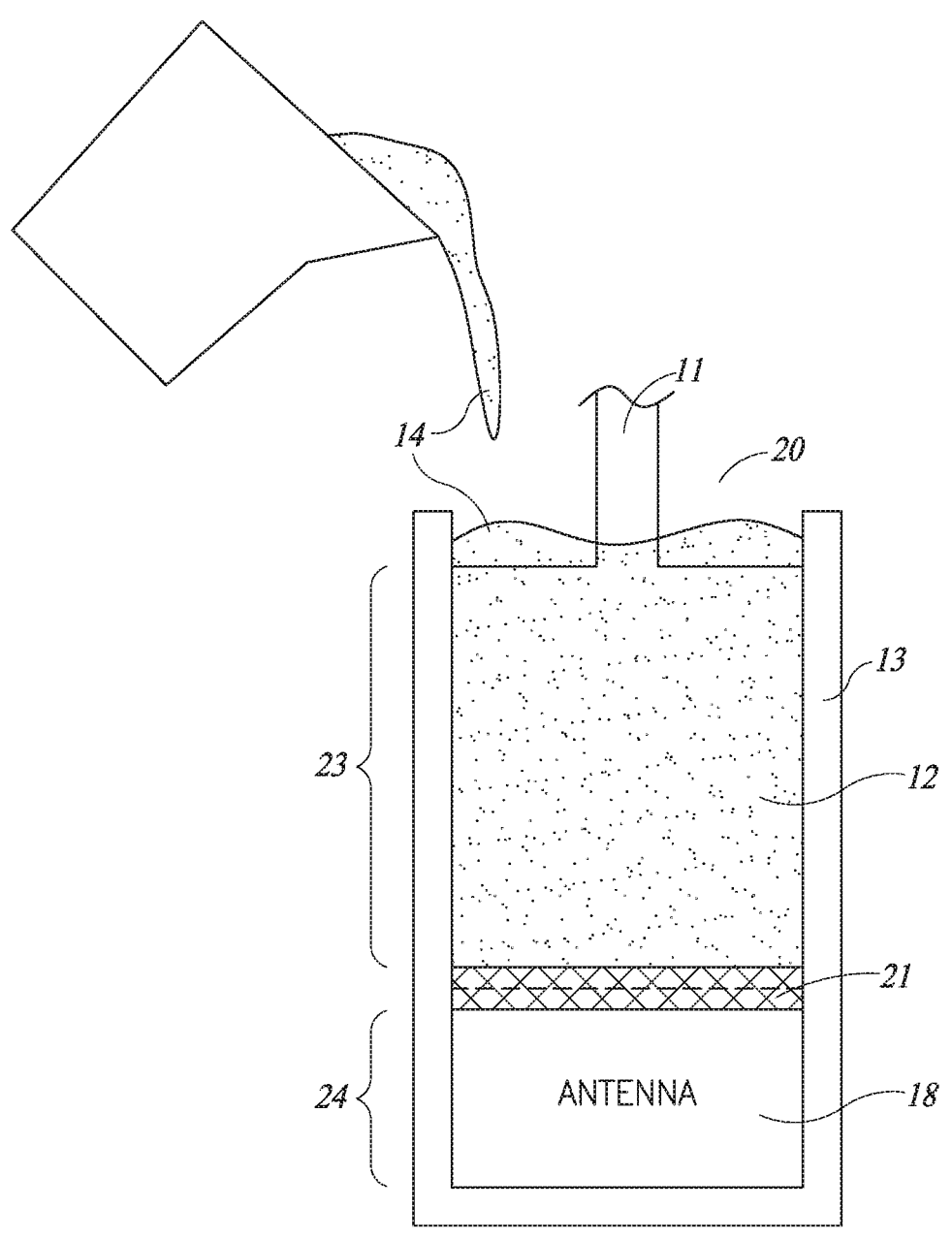
FIG. 3 is a schematic illustration of a prior art method of sealing a transceiver enclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the antenna does not need to be completely free of potting compound and the transceiver can operate adequately with small quantities of potting compound on the antenna, as explained herein below.

Figure 4:
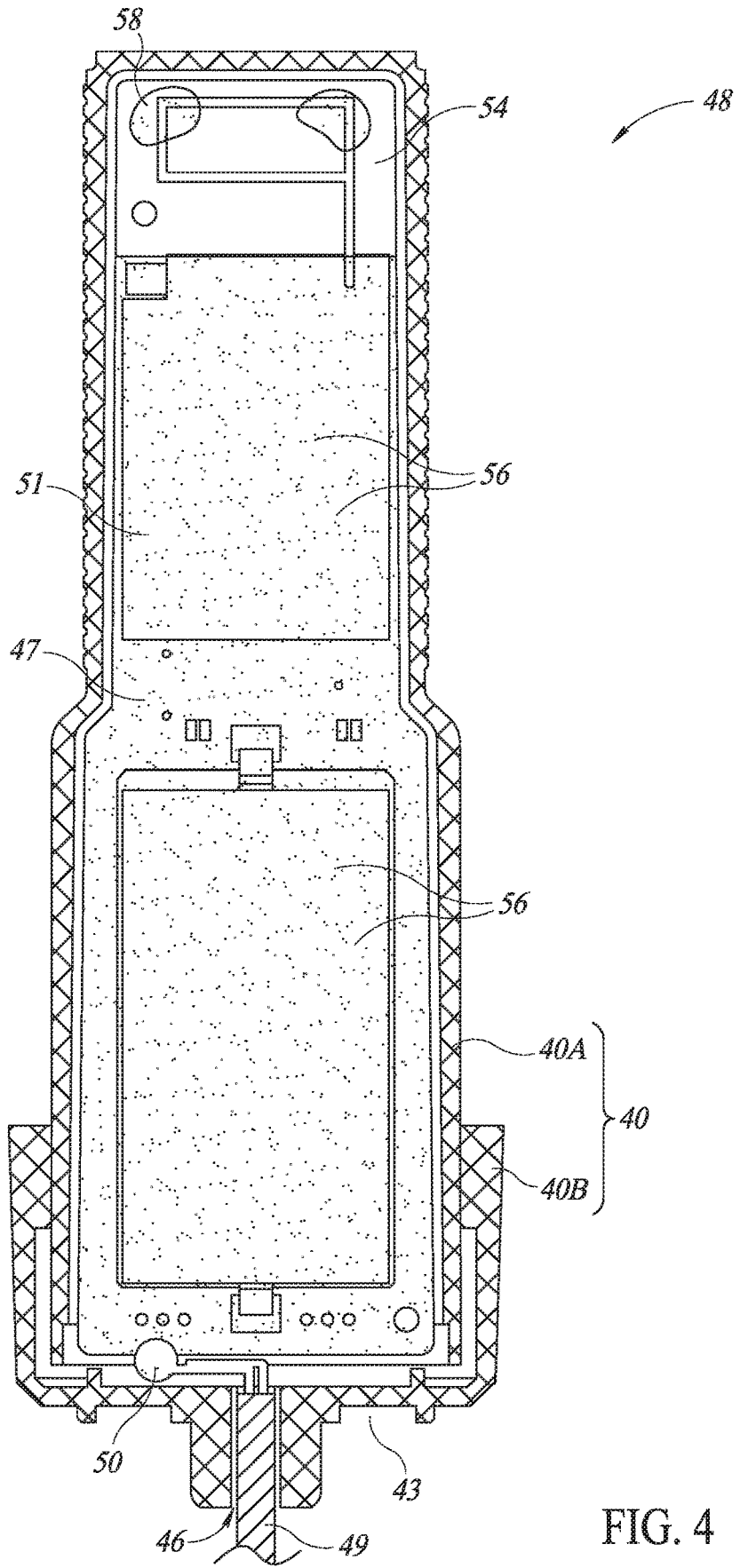
FIG. 4 is a schematic illustration of transceiver board sealed in an enclosure.

Reference is now made to FIG. 4 which illustrates a transceiver assembly 48 comprising a transceiver board 47 in a sealed housing 40, Transceiver board 47 may comprise multiple components, such as: an RF-transceiver to communicate with the data collection device, a central processing unit (CPU) to process meter data and handle data transmission, a battery to power transceiver board 47 and an antenna 54. Transceiver board 47 may be connected to one or more utility meters 5 (shown in FIG. 1) via one or more interface cables 49 or via a wireless connection (not shown). Sealed housing 40 may comprise a first part 40A, and a second part 40B. If required, sealed housing 40 may further comprise a means of ingress for liquid potting compound 56 (not shown), and a means to seal the means of ingress (also not shown). In this embodiment, liquid potting compound may be added through open end 43 directly, and hence not require a separate ingress means and sealing means. In the current embodiment, first part 40A may be an open-ended single cavity enclosure, and second part 40B may be a cap as shown in FIG. 4. Second part 40B may attach to first part 40A using any method known in the art, such as a weld, glue, screw-thread, pressure connection, clips, clamps, etc. Second part 40B may be attached, on the outside, or on the inside, or directly to the open end 43 of first part 40A. Second part 40B may further comprise an interface-opening 46 to enable interface cable 49, that may be soldered 50 to transceiver board 47, to exit sealed housing 40. It should be noted that interface cable 49 may be attached to transceiver board 47 by any method known in the art. A gasket (not shown) may be present in interface-opening 46. The combination of interface cable 49, together with the optional gasket, may stop liquid potting compound 56 from leaking from sealed housing 40 through interface-opening 46. Transceiver board 47 may be sealed into sealed housing 40 using a measure of liquid potting compound 56.

Reference is now made to FIGS. 5A, 5B, 5C and 5D which demonstrate a first method to seal or pot transceiver board 47 into sealed housing 40.

Figures 5A, 5B, 5C:
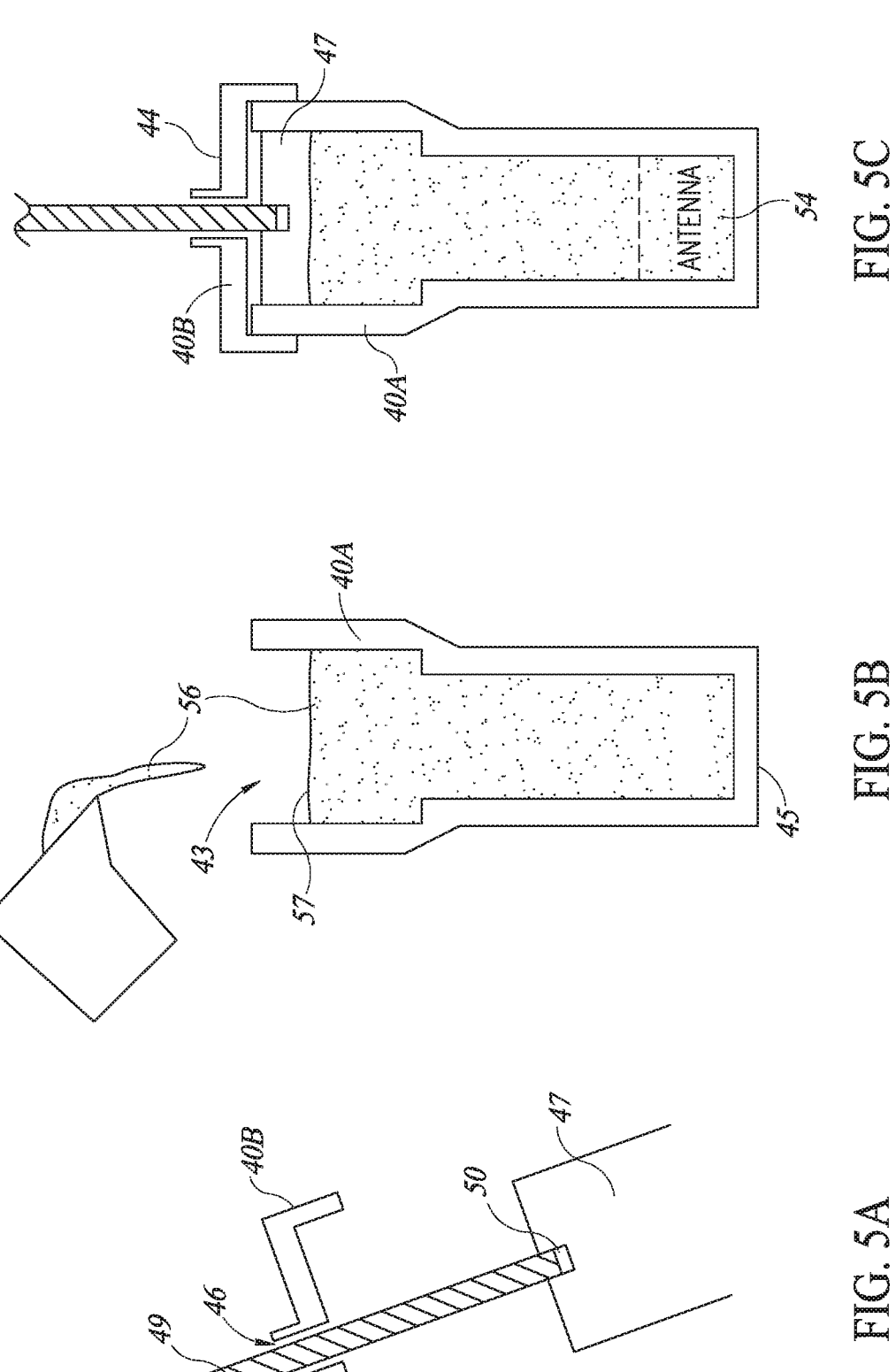

First, as shown in FIG. 5A, interface cable 49 may be threaded through interface opening 46 in second part 40B and may be soldered 50 to transceiver board 47.

As shown in FIG. 5B, a measured quantity of liquid potting compound 56 may be poured into first part 40A, partially filling it to level 57.

Then, as indicated in FIG. 5C, transceiver board 47 may be inserted into first part 40A through open end 43 into rails or other locating device (not shown) in first part 40A that hold transceiver board 47 in place. Antenna 54 may be located in closed end 45 of first part 40A. Then second part 40B may be secured to first part 40A, forming sealed housing 40.

Then, as indicated in FIG. 5D, transceiver assembly 48 may be inverted to allow liquid potting compound 56 to settle away from antenna 54. As liquid potting compound 56 settles, small quantities of potting compound residue 58, as shown in FIG. 4, may remain on antenna 54. As described hereinbelow, these small quantities may not materially affect the operation of antenna 54.

After liquid potting compound 56 solidifies, it may seal transceiver board 47 within housing 40 and may leave antenna 54 in a cavity at the closed end 45 of first part 40A.

Figures 6C, 6D:
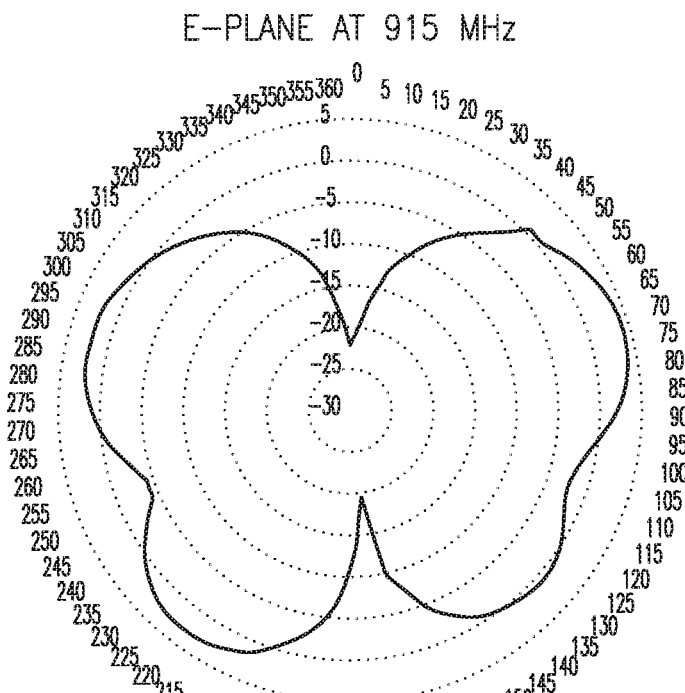
Figure 6E:
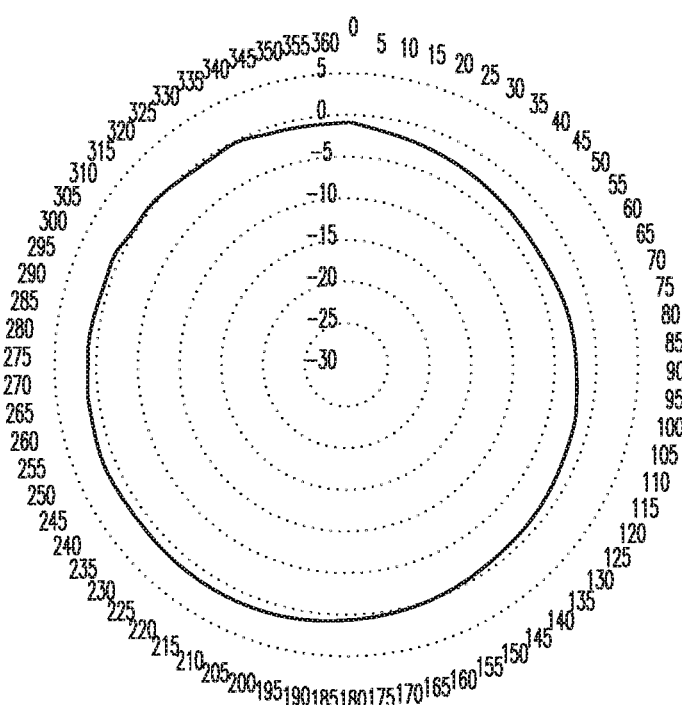
Figure 6F:
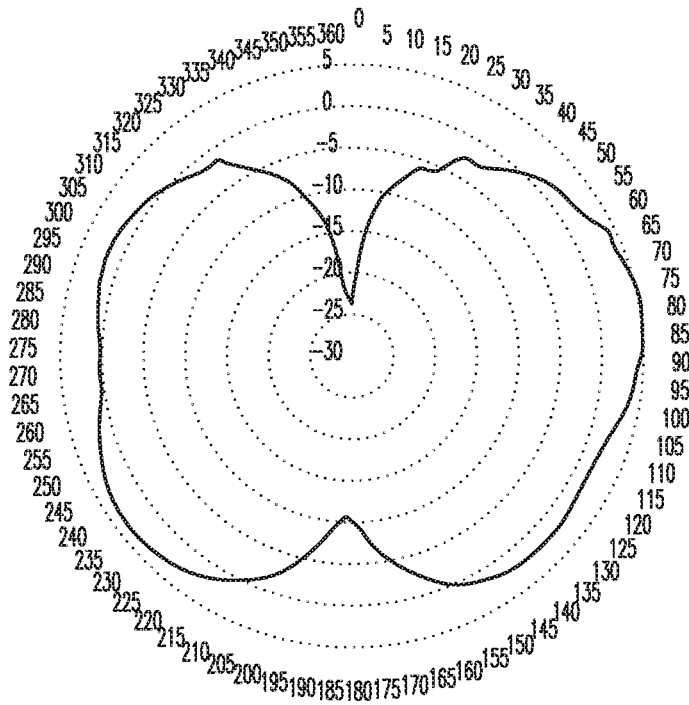

Applicant has tested exemplary antennas described hereinbelow, in an anechoic chamber, with and without residual potting compound 58 on them, and the recorded antenna gain is not materially affected within the 902-928 MHz frequency range. The table of results in FIG. 6A presents the antenna gain results when antenna 54 is completely free of potting compound. The table of results in FIG. 6D presents results when traces of potting compound 58 remain on antenna 54. The plots in FIGS. 6B and 6E present antenna radiation patterns, circular in the horizontal plane (H-Plane) produced by the exemplary omni-directional antenna: the plot in FIG. 6B shows radiation patterns when there are no potting compound traces 58 on antenna 54, and the plot in FIG. 6E shows radiation patterns when there are traces of potting compound 58 on antenna 54. The plots in FIGS. 6C and 6F show a beamwidth of more than 90 degrees in the elevation plane (E-Plane) produced by the same antenna: the plot in FIG. 6C shows radiation patterns of the antenna without potting compound traces 58 on antenna 54, and the plot in FIG. 6F shows radiation patterns with residual potting compound 58 on antenna 54.

As can be seen by a comparison of the tables of results in FIGS. 6A and 6D, the performance of antenna 54 may not be adversely affected by residual potting compound 58 and a review of the radiation patterns in FIGS. 6B, 6C, 6D and 6F shows that in the horizontal and elevation planes, performance remains stable with similar gain values.

Thus, antennas which are generally, though not entirely, free of potting compound, may still perform acceptably. It should be noted that this residual potting compound method may be applicable to antennas operating in all frequency bands and across all antenna designs.

Figure 7:
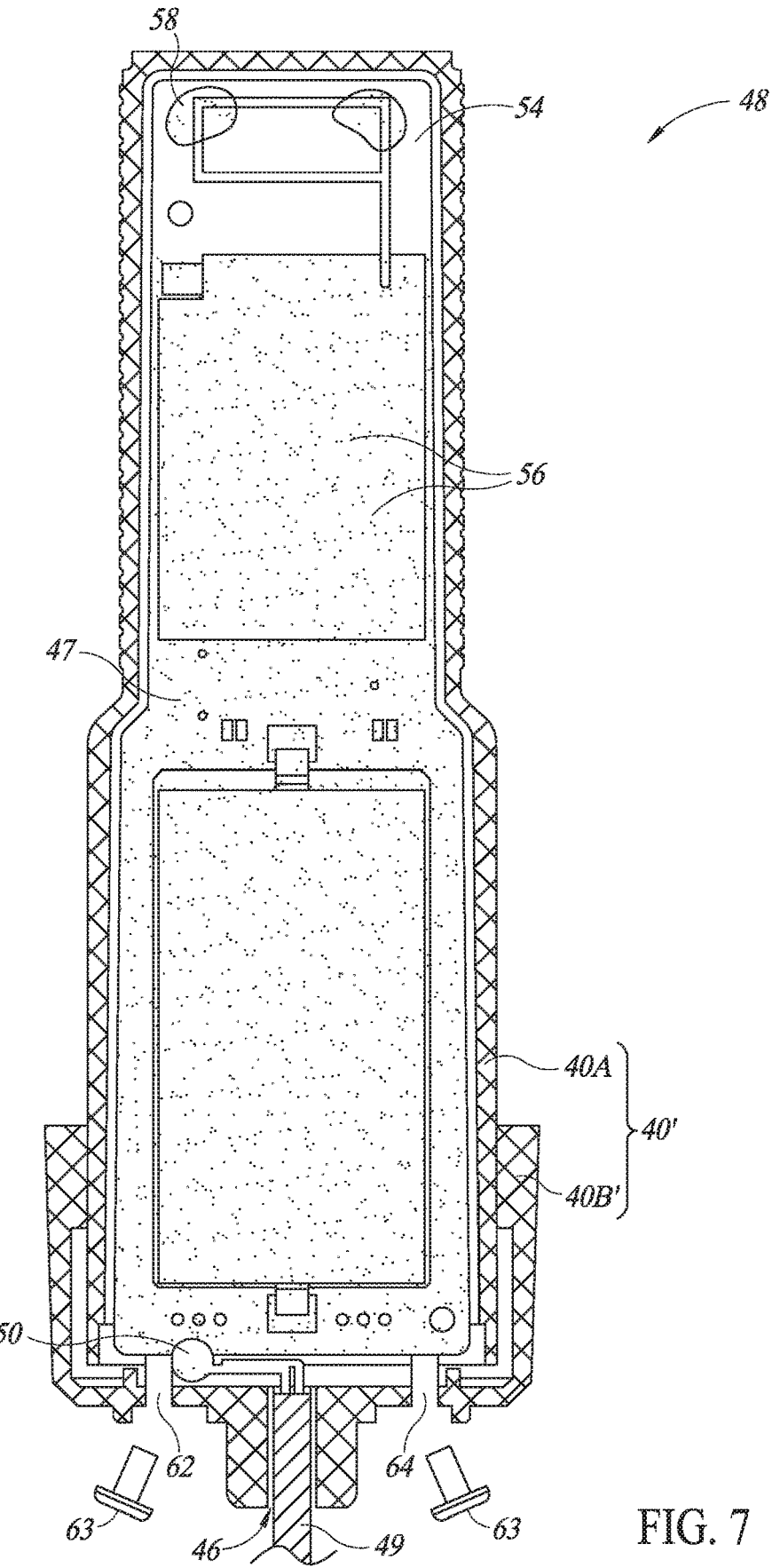
FIG. 7 is a schematic illustration of transceiver board sealed in an enclosure.

In an alternative embodiment, as illustrated in FIG. 7 to which reference is now made, second part 40B, here labeled 40B', may comprise a means of ingress 62 for adding liquid potting compound and its associated sealing means 63. In this embodiment there may be a means for egress 64 for steam, and its associated sealing means 63. Means of ingress and egress may be simple openings with associated bungs as a means to seal them. In this embodiment, as in the previous embodiment, interface cable 49 may be threaded through interface opening 46 and may be soldered 50 to transceiver board 47. Then transceiver board 47 may be inserted into 40A and antenna 54 may be positioned in closed end 45 of first part 40A and then second part 40B' may be secured to first part 40A to form sealed housing 40'.

Figure 8:
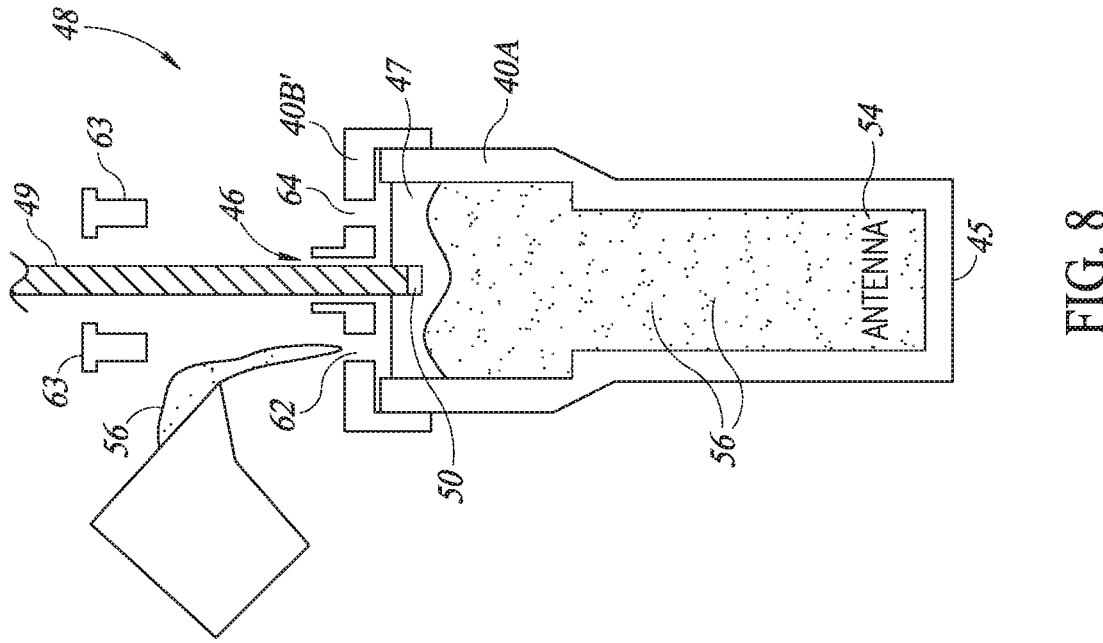
FIG. 8 is a schematic illustration of a method of sealing a transceiver enclosure.

However, in this embodiment, as illustrated in FIG. 8, liquid potting compound 56 may be added after assembly, through means of ingress 62. Any steam from liquid potting compound 56 exits sealed housing 40' through means of egress 64. It should be noted that sealing means 63 may be removed from second part 40B' at any time up to this time of filling. After liquid potting compound 56 is added, sealing means 63 may be replaced in means of ingress 62 and in means of egress 64. Then, transceiver assembly 48 may be inverted as in previous embodiments to leave the antenna portion generally free of potting compound 56. After liquid potting compound 56 solidifies, it may seal transceiver board 47 within sealed housing 40' and may leave antenna 54 in a cavity at the closed end 45 of first part 40A.

Figure 9:
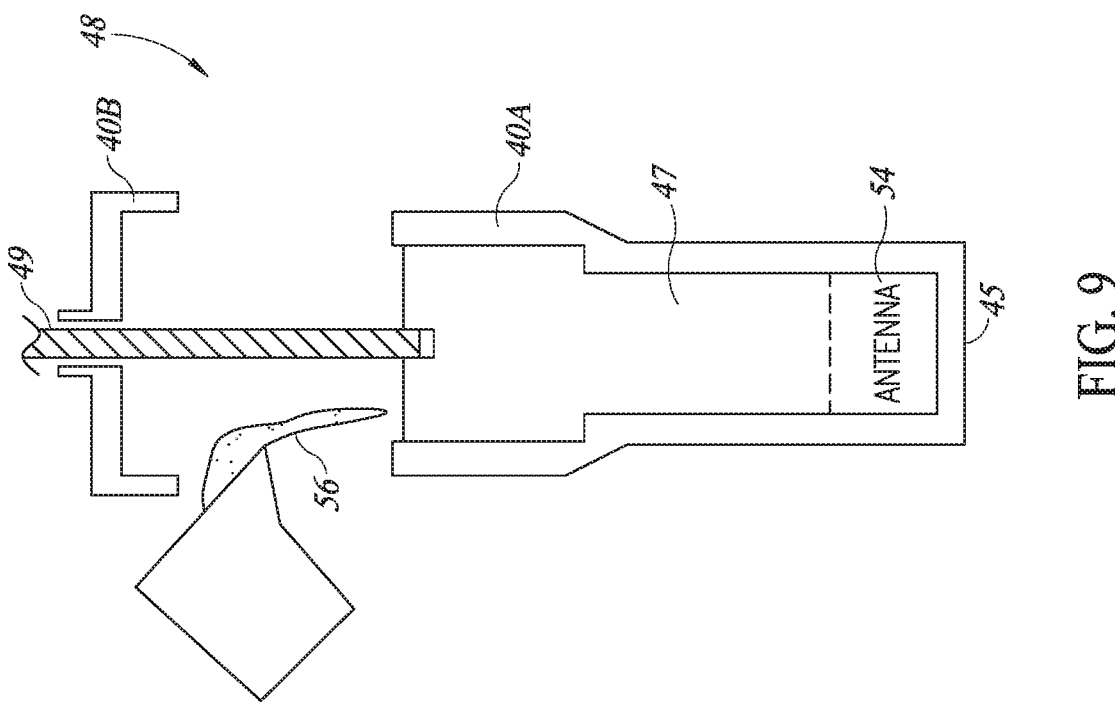
FIG. 9 is a schematic illustration of a method of sealing a transceiver enclosure.

Reference is now made to FIG. 9 which illustrates an alternative method of manufacture of transceiver assembly 48 of FIG. 4. In this embodiment, as illustrated, interface cable 49 may be threaded through interface opening 46 and then may be soldered 50 to transceiver board 47. Then transceiver board 47 may be inserted into first part 40A with antenna 54 in closed end 45 of first part 40A as previously described. However, in the embodiment of FIG. 9, liquid potting compound 56 may then be added and then second part 40B may be secured to first part 40A. Then, transceiver assembly 48 may be inverted as in previous embodiments to leave the antenna portion generally free of potting compound 56. After potting compound 56 solidifies, it may seal transceiver board 47 within housing 40 and may leave antenna 54 in a cavity within closed end 45 of first part 40A.

As illustrated hereinabove, the preferred embodiments of the present invention may comprise a sealed housing 40 that may further comprise a first part 40A with cylindrical profile, and a second part 40B with a similar interlocking cylindrical profile. First part 40A may have a single cavity, and may be manufactured as a single part, with a closed end 45 and an open end 43 into which transceiver board 47 may be inserted and second part 40B used to seal open end 43.

Applicant has realized that the abovementioned method to seal transceiver boards is not limited to housings with cylindrical profiles, that may be manufactured from a first part 40A with an attached second part 40B, or even as a housing 40 comprising a single cavity.

Figure 10A:
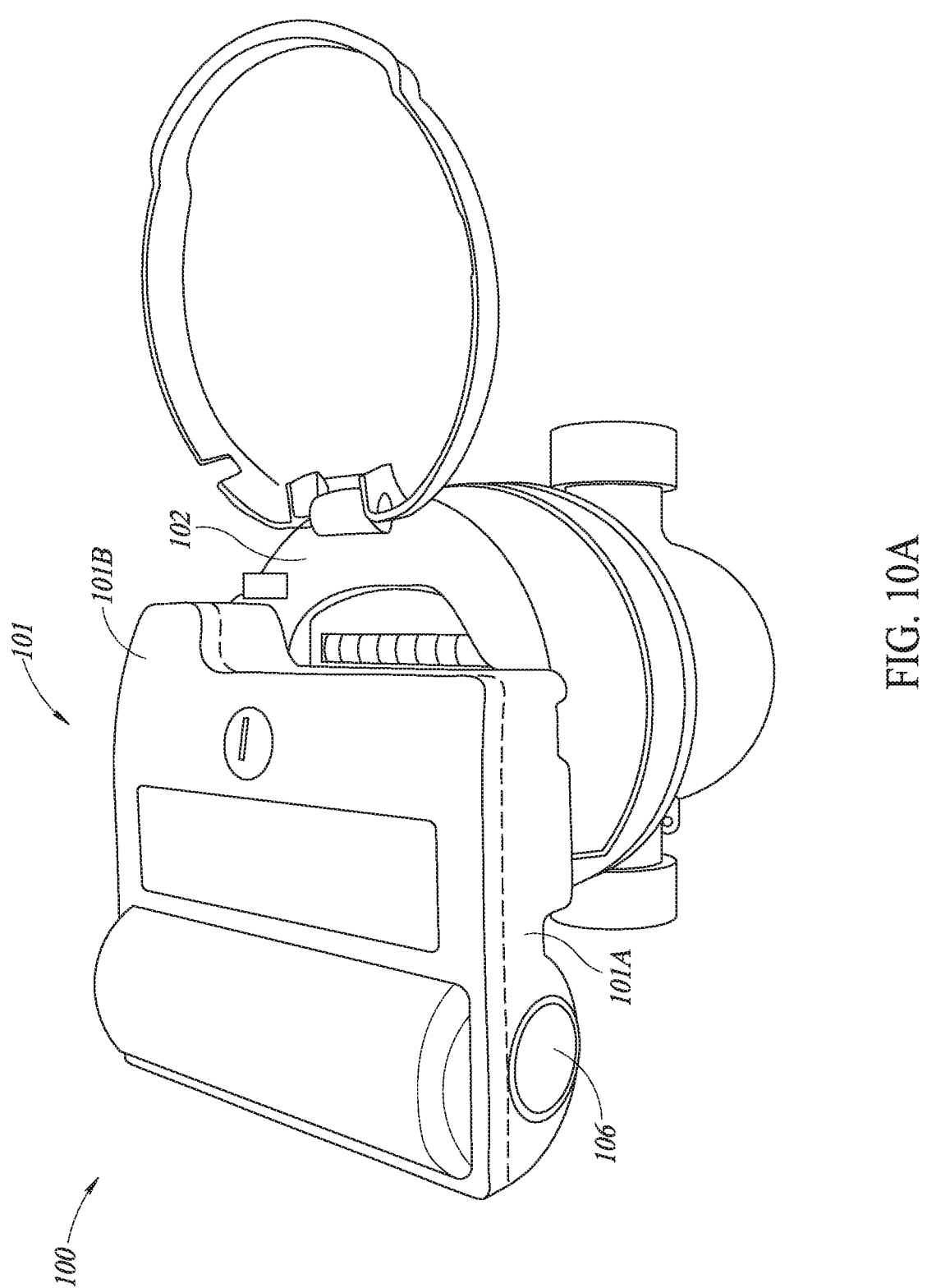
FIGS. 10A, 10B, 10C and 10D are schematic illustrations of a preferred embodiment of a transceiver assembly.
Figure 10B:
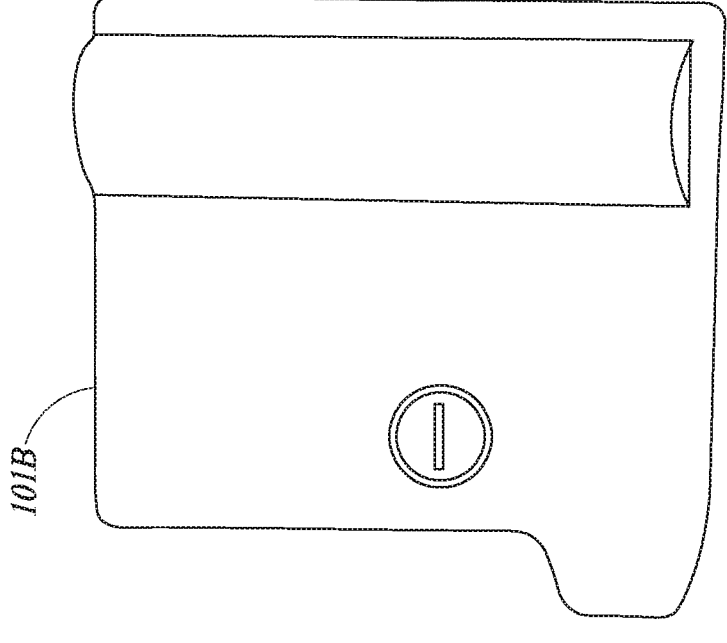
Figure 10B:
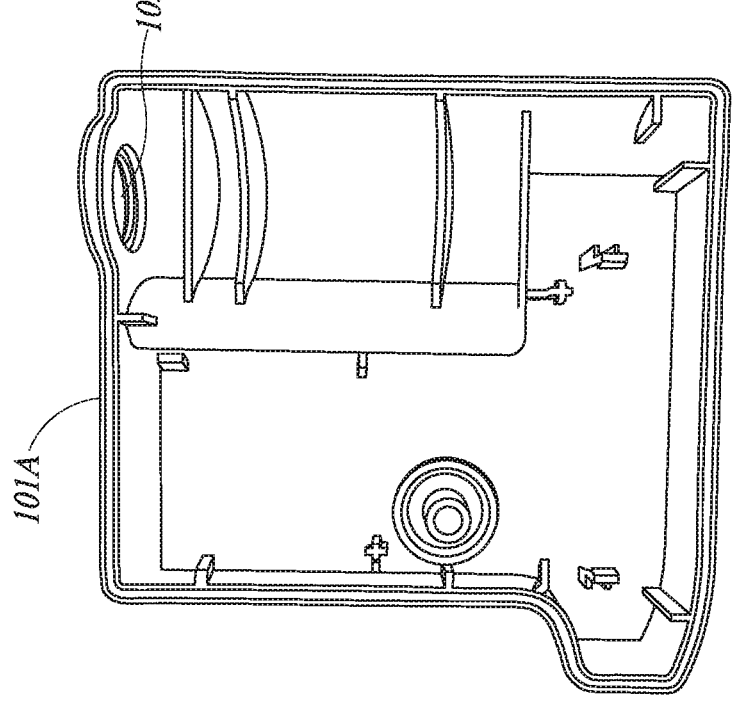
Figure 10C:
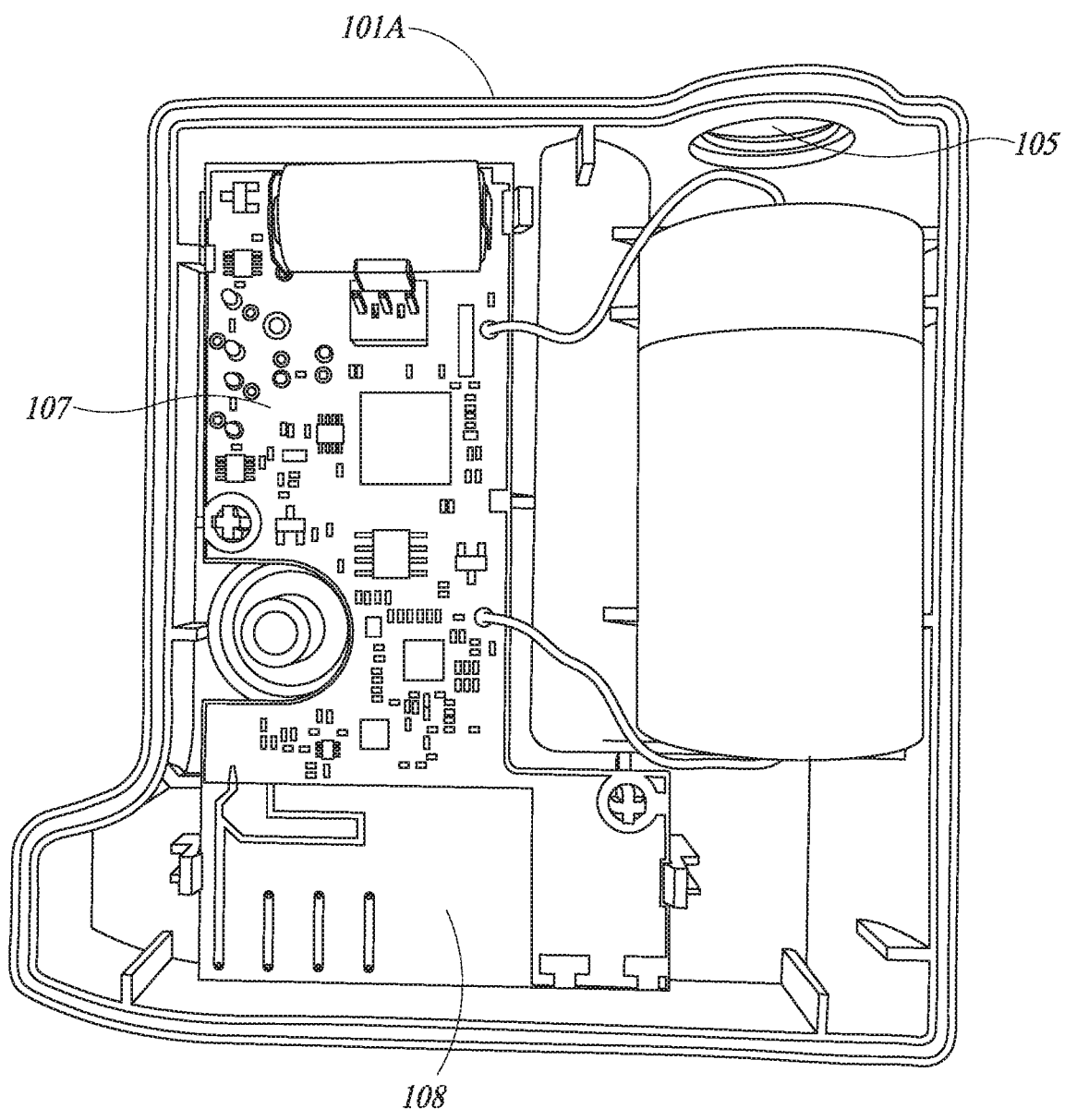
Figure 10D:
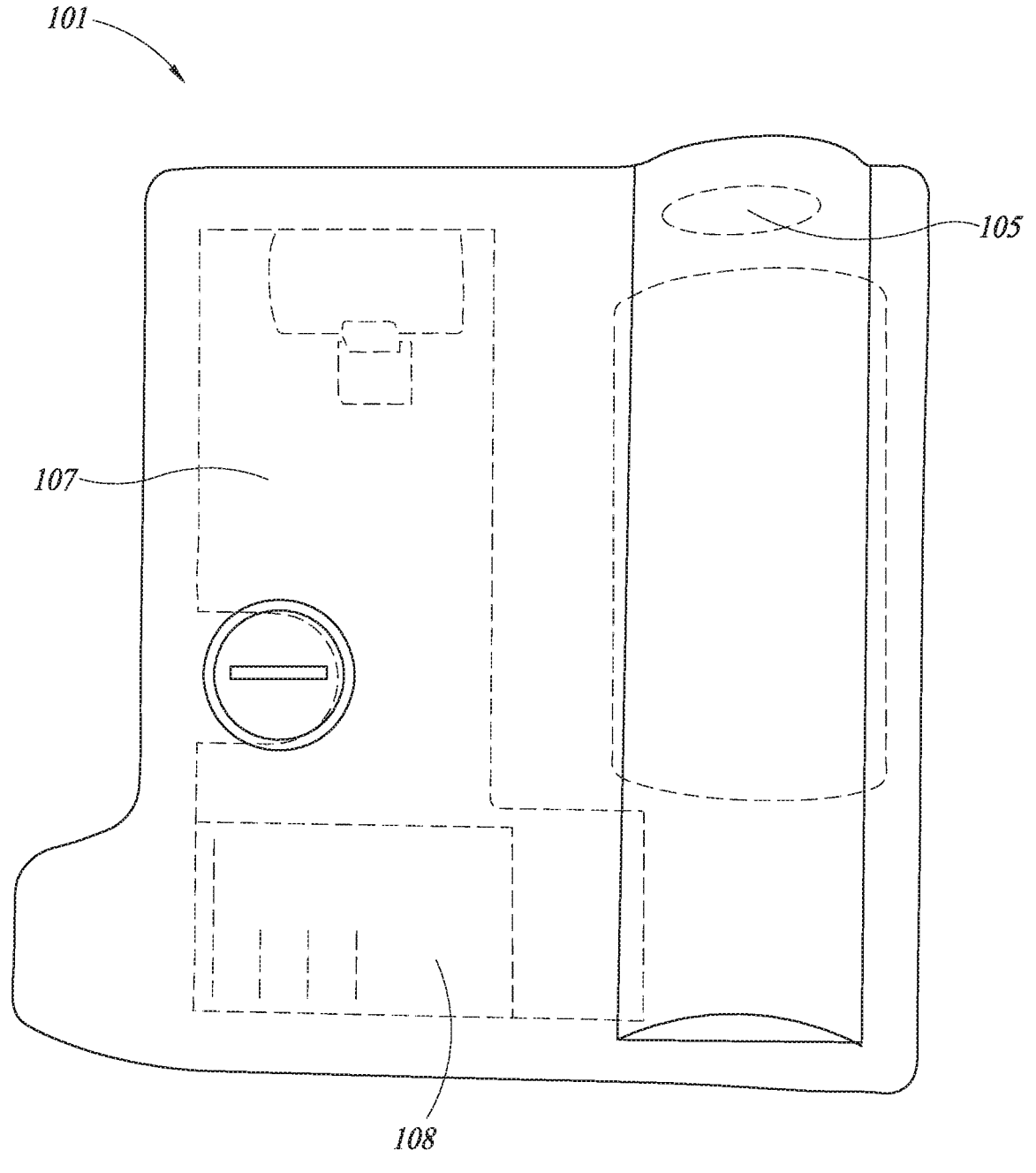

Reference is now made to FIGS. 10A, 10B, 10C and 10D which illustrate assembly 100 comprising a sealed housing 101 containing a transceiver board 107 (not shown). Housing 101 may be designed to attach to a utility meter 102, that may be positioned above ground or in a pit. Housing 101 may be single cavity enclosure, and may be fabricated as 2 parts, a first part 101A and a second part 101B. First part 101A may further comprise a means of ingress 105 for liquid potting compound 56 and an associated sealing means 106. As shown in FIG. 10C, transceiver board 107 may be inserted into either first part 101A (as shown), or second part 101B, and enclosure 101 completed by connecting first part 101A and second part 101B together, using any method known in the art, as shown in FIG. 10D.

Figures 11A, 11B, 11C:
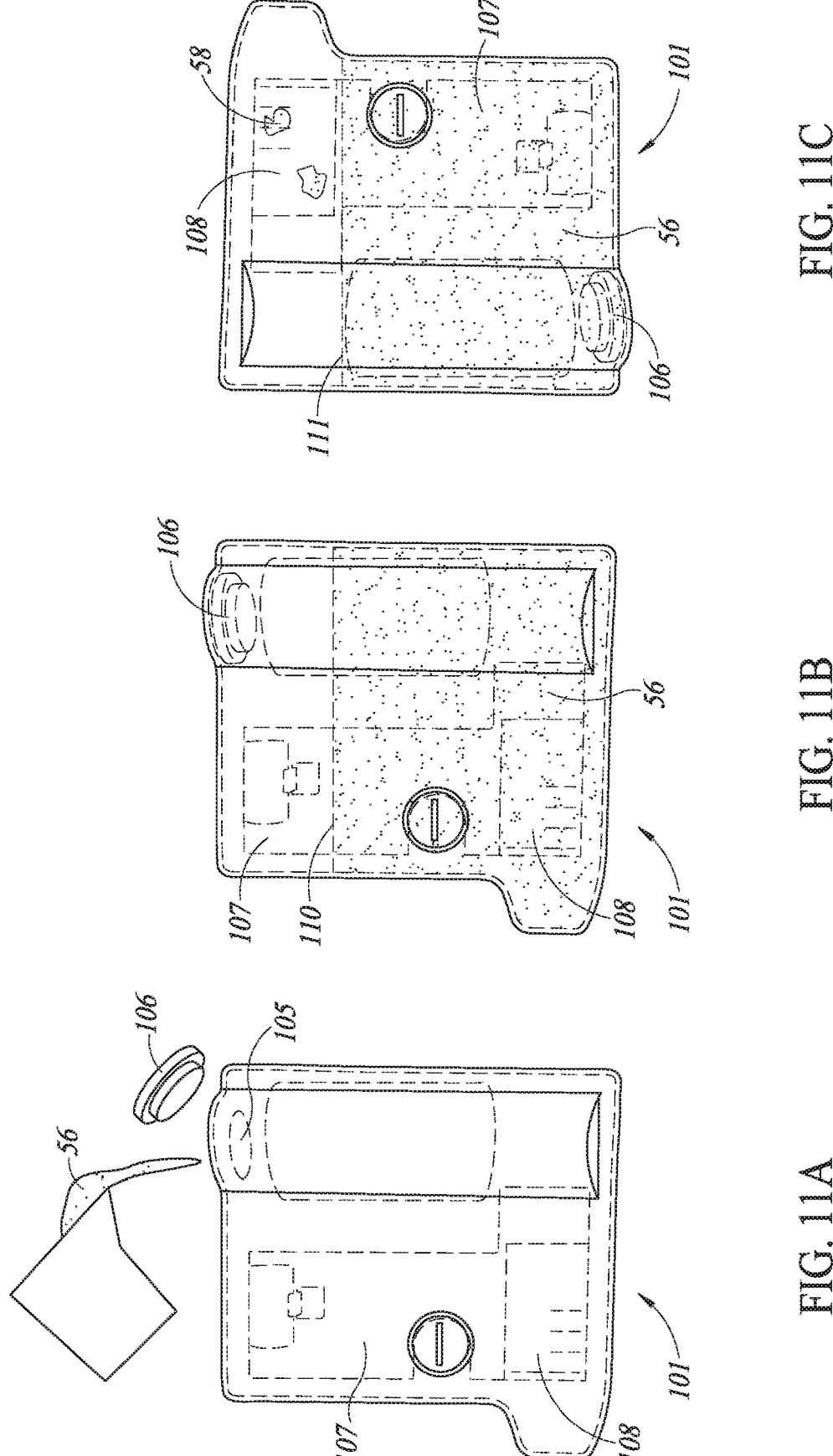
FIGS. 11A, 11B, and 11C are schematic illustrations of a method of sealing an exemplary transceiver assembly.

FIGS. 11A, 11B and 11C illustrate the potting method for sealing the aforementioned assembly 100, similar to that mentioned hereinabove. A measured quantity of potting compound 56 may be poured through means of ingress 105 to a partial level 110. Then sealing means 106 may be placed into ingress means 105 and sealed housing 101 inverted to allow potting compound 56 to flow away from antenna 108 of transceiver board 107, to a partial level 111 leaving only small quantities of potting compound 58 on antenna 108.

It will be appreciated that the enclosure and associated transceiver board used with the above-mentioned potting method, may not be limited in shape, size or method of construction. Any enclosure and transceiver design may be appropriate as long as such an enclosure has a means of ingress, such as a port, hole, or other opening for liquid potting compound to be introduced into the enclosure, and a means to seal the ingress such that the liquid potting compound stays within the enclosure. The assembly may also allow liquid potting compound to flow away from the antenna of the transceiver board during sealing, by inverting or otherwise repositioning the assembly, leaving only small quantities of potting compound on the antenna. Likewise, it will be appreciated that the number of cavities, and the number of openings and the number of associated transceiver boards may also not be limited, as long as potting compound may flow away from any antennas during the sealing process. It will also be appreciated that in a multi-cavity embodiment, potting compound may be added in a plurality of steps and an enclosure inverted or otherwise repositioned a plurality of times, such that potting compound may settle away from all antennas within the enclosure.

It will also be appreciated that the type of transceiver being sealed may not be limited to a specific utility such as water, and also not be limited to the type of meter, whether it be a mechanical meter reader as in FIG. 10A, or a fully digital embodiment. As mentioned hereinabove, the transceiver may also not be limited in how it connects to the utility meter, and may be a wired connection, optical, magnetic, electromagnetic, or any other connection method known in the art. It will also be appreciated that utility meters may include water, gas, electricity, and any other utility known in the art. Further, how the transceiver transmits collected data may also not be limited to a wired connection, near field connection, cellular, satellite or other transmission technologies known in the art.

It will be appreciated that sealing transceivers in enclosures that may be left for extended periods of time in wet, corrosive, dusty environments may extend the operational lifespan of such devices by protecting them from ingress of damaging pollutants.

Reference is now made to FIGS. 12A and 12B which illustrate an exemplary embodiment with a dipole antenna 70 on transceiver board 47. FIG. 12A shows the components of transceiver 78 and the components of the central processing unit (CPU) on transceiver board 47, that are usually obscured by a protective cover 51 (as seen in FIG. 4). Dipole antenna 70 comprises two poles: one pole comprising a multi-element array PCB antenna 71; and a second pole 72 implemented with a portion of electrical components 74 on transceiver board 47.

Multi-element array PCB antenna 71 comprises vertical array elements 76 attached to one side of transceiver board 47, as shown in FIG. 12A, and angled array elements 77 attached to the other side of transceiver board 47, as shown in FIG. 12B, and an impedance matching element 73 (FIG. 12A). Elements 76 and 77 connect through transceiver board 47 using vias or any other method known in the art.

Applicant has realized that a printed circuit board (PCB) antenna implementation significantly reduces the cost of manufacture, transceiver failure rate, and cost. The arrangement of elements 76 and 77 minimizes the effects of transmission wave reflections on obstacles near to the antenna, described in the art as a low voltage standing wave ratio (VSWR) antenna. Low VSWR antennas are highly desirable in water-pit applications as pits contain many such obstacles. Low VSWR antennas have longer transmission distances and reduced power drain on the transceiver board battery 79. This gives transceiver installations a longer maintenance lifecycle.

Applicant has realized that by using components 74 on transceiver board 47 as a second antenna pole, the gain of antenna 70 may be higher than antennas previously utilized in utility pit applications, specifically those mentioned in US patent publications: U.S. Pat. Nos. 10,164,320, 5,825,303 and 2010/0026515A.

Applicant has also realized that antenna 70 can operate adequately when its first pole, i.e. multi-element array PCB antenna 71, may be covered with small amounts of potting compound 58 (as shown in FIG. 4), even though its second pole 72, i.e. components 74, may be completely covered in potting compound 56. It should be noted that this method applies to any type of antenna system, where a portion of the antenna may be left free of potting compound while another portion may be completely covered in potting compound. Exemplary antenna systems may be: monopole, dipole, loop, either with or without a ground plane, and any other known in the art.

Impedance matching element 73 may be an additional transmitting and receiving element of antenna 70 and may be a calibrated PCB trace that adjusts the total impedance of antenna 70 to match the output impedance of transceiver 78. It may not be an impedance matching circuit, or pad, comprising inductive, resistive, and capacitive components (known in the art as an LRC circuit). The length and shape of impedance matching element 73 may be calibrated to sufficiently adjust the impedance of dipole antenna 70 to equal 50-ohms. It will be appreciated that employing an LRC pad in a transceiver, increases the manufacturing cost and complexity, and increases failure rates.

Applicant has realized that by connecting antenna 70 to transceiver 78 with an antenna element that may be a calibrated PCB trace, manufacturing complexity may be reduced and reliability increased.

Applicant has also realized that power that would be wasted in an LRC pad can be used to increase the gain of antenna 70.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A sealed utility transceiver assembly, comprising:

at least one transceiver board, said at least one transceiver board comprising multiple components and at least one antenna;

a sealed housing comprising at least one cavity within which to house said at least one transceiver board; and a measure of liquid potting compound encapsulating a portion of said at least one transceiver board within said sealed housing, said portion not including the entirety of said at least one antenna, wherein said sealed housing further comprises:

means of ingress to enable said measure of liquid potting compound to be added to said sealed housing; and means to seal said means of ingress after addition of said measure of liquid potting compound.

2. The assembly of claim 1, wherein said sealed housing further comprises at least one first part and at least one second part, such that said at least one first part and said at least one second part combine to form said sealed housing and wherein said at least one first part and said at least one second part comprise one of: a cylindrical shaped enclosure with an interlocking cylindrical shaped cap, and two parts of a non-uniform shaped enclosure.

3. The assembly of claim 2, wherein said non-uniform shaped enclosure comprises an attachment means to attach said assembly to a utility meter.

4. The assembly of claim 3 wherein said utility is at least one of: water, gas, electricity, energy, and fuel.

5. The assembly of claim 1, wherein said sealed housing further comprises an interface-opening in said sealed housing to enable an interface cable from said at least one transceiver board to exit said sealed housing.

6. The assembly of claim 5, wherein said interface-opening comprises a gasket inside said interface-opening to seal said interface cable within said interface-opening and to stop said measure of liquid potting compound from leaking from said interface-opening.

7. The assembly of claim 1 wherein said at least one antenna is one of: a dipole antenna, and a monopole antenna.

8. The assembly of claim 7 wherein said dipole antenna comprises:

a printed PCB antenna, printed on two sides of said at least one transceiver board, multiple antenna-elements attached to said printed PCB antenna, said printed PCB antenna implementing a first antenna pole of said dipole antenna;

a non-LRC impedance matching antenna element to increase a gain of said dipole antenna, and to adjust the total impedance of said dipole antenna to match the output impedance of said at least one transceiver board; and a second antenna pole implemented with a portion of electrical components of said at least one transceiver board.

9. The assembly of claim 8 wherein at least a portion of said non-LRC impedance matching antenna element and said second antenna pole are completely covered by said measure of liquid potting compound.

10. A method for assembling a sealed utility transceiver assembly, the method comprising:

partially filling said assembly with a measure of liquid potting compound, said assembly comprising at least one transceiver board comprising multiple components and at least one antenna, and a sealed housing comprising at least one cavity within which to house said at least one transceiver board; and repositioning said assembly to enable said measure of liquid potting compound to settle away from said at least one antenna, wherein said partially filling comprises pouring said measure of liquid potting compound through a means of ingress.

11. The method of claim 10 and also comprising:

before said partially filling, inserting said at least one transceiver board into said sealed housing, said sealed housing comprising at least one first part and at least one second part;

connecting said at least one first part and said at least one second part to form said sealed housing, said sealed housing having a means of ingress for said measure of liquid potting compound and a means to seal said means of ingress; and sealing said means of ingress after said partially filling.

12. The method of claim 11, wherein said at least one first part and said at least one second part comprise one of: a cylindrical shaped enclosure with an interlocking cylindrical shaped cap, and two parts of a non-uniform shaped enclosure.

13. The method of claim 12, wherein said non-uniform shaped enclosure comprises an attachment means to attach said assembly to a utility meter.

14. The method of claim 13 wherein said utility is at least one of: water, gas, electricity, energy, and fuel.

15. The method of claim 10 and also comprising:

after said partially filling, inserting said at least one transceiver board into said sealed housing, said sealed housing comprising at least one first part and at least one second part;

connecting said at least one first part and said at least one second part to form said sealed housing.

16. The method of claim 15, wherein said at least one first part and said at least one second part comprise one of: a cylindrical shaped enclosure with an interlocking cylindrical shaped cap, and two parts of a non-uniform shaped enclosure.

17. The method of claim 16, wherein said non-uniform shaped enclosure comprises an attachment means to attach said assembly to a utility meter.

18. The method of claim 17 wherein said utility is at least one of: water, gas, electricity, energy, and fuel.

* * * * *